Aug. 11, 1931.   L. CONSTANTIN   1,818,044
CONTROLLING DEVICE FOR AIRCRAFT
Filed April 19, 1929   2 Sheets-Sheet 1
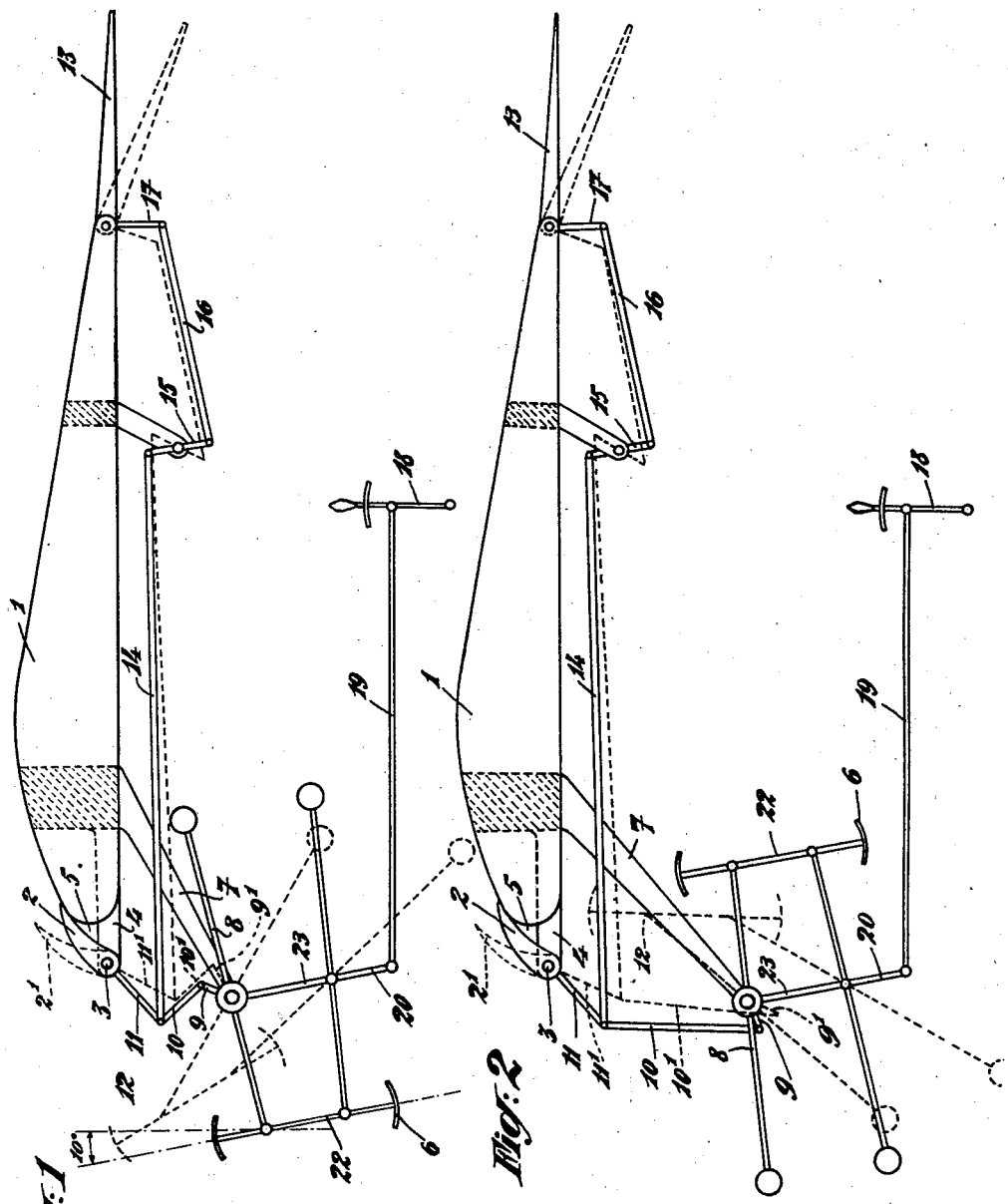
INVENTOR.
LOUIS CONSTANTIN
BY Frank H. Borden
ATTORNEY.

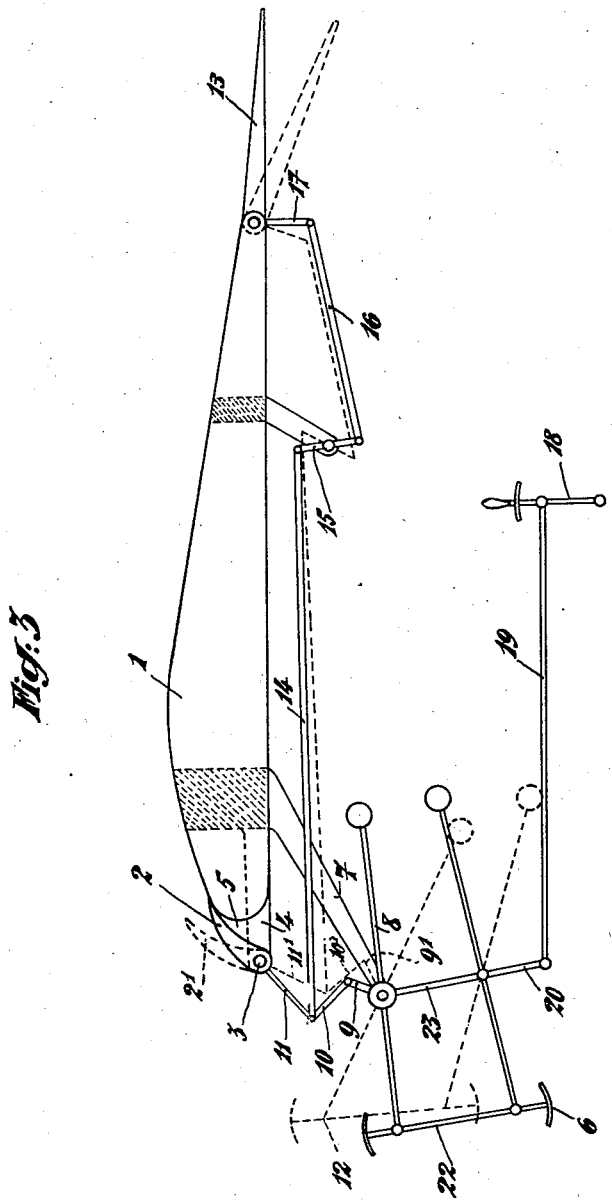

Patented Aug. 11, 1931

1,818,044

UNITED STATES PATENT OFFICE

LOUIS CONSTANTIN, OF PARIS, FRANCE

CONTROLLING DEVICE FOR AIRCRAFT

Application filed April 19, 1929, Serial No. 356,504, and in France May 5, 1928.

My invention relates to particular applications of windvanes to aviation, as controlling device.

It is frequently necessary in aviation to effect certain operations such as the flowing of a fuel tank, the changing of the curve of a wing, the opening of a slot in a slotted wing and like operations whose execution requires a complex mechanism to be brought into play by the pilot which is difficult and often dangerous. Furthermore, it might be of interest to cause this mechanism to automatically act on a leading angle of given magnitude determined in advance.

Windvanes judiciously employed allow these various problems to be resolved in very advantageous fashion.

The invention will be more readily understood in the following description when taken in connection with the accompanying drawings: Fig. 1 of which represents a diagrammatic section of a slotted aeroplane wing with my device applied; Fig. 2 represents a diagrammatic section of a modified form of wind vane; and Fig. 3 represent a diagrammatic section of a still further modified form of wind vane.

Referring to the drawings (more in detail), and particularly to Fig. 1, 1 represents a section of wing, provided with an auxiliary surface 2 capable of turning about a shaft 3 for example, carried by the support 4. According to whether the slot 5 formed thereby is open or closed, the aerodynamic properties of the wing change and it is advantageous that the slot be closed for small sustaining angles and be open for high sustaining angles such as 8 to 10 degrees for example or even more.

A windvane 6, preferably of the type described in my U. S. patent application No. 512,367 of November 2, 1921 supported by the support 7 carries, invariably connected to one of its oscillating arms 8, a lever 9 which controls by means of a link 10 a lever 11 rigid with a pivot shaft 3.

It will be obvious that if the windvane is displaced 10 degrees forward with respect to the vertical, the wing span being assumed to be horizontal, said windvane will remain stationary as long as the sustaining angle is less than 10 degrees and the slot before referred to will remain closed, the surfaces having a negative incidence. For a sustaining angle greater than 10 degrees, the windvane will deviate upwards to the position 12, the lever 9 will take the position 9', the link 10 the position 10', the lever 11 the position 11' and the auxiliary plane 2 the position 2'. The slot will open and remain so until the sustaining angle falls below 10 degrees.

The operation is entirely automatic.

At the moment the slot opens, it may be of interest to lower the aileron 13 and to raise the same when the said slot is closed. The links 14 and 16 and the levers 15 and 17 act in unison to perform this automatic operation.

In addition the pilot acting, by means of lever 18 on the link 19 of the lever 20 can orientate the windvane at will, that is, instigate the automatic movement of the whole at will and at the sustaining angle desired.

Instead of utilizing the displacement of the lever 9 for the opening or closing of a slot, for lowering or elevating an aileron of curvature, it is to be understood that I may also utilize, for operation in connection or not with the movements above disclosed, ordinary ailerons, of the width of a fuel tank as well as operate a safety apparatus and the like, that is to assure operation automatically or manually from a remote point by a suitable mechanism.

It is advantageous, because of these particular qualities, to preferably utilize a windvane of the Constantin type, but all other windvanes may likewise be employed. For example, the two symmetrical surfaces might be replaced by one or several non-symmetrical ones. The counterweights might also be disposed of. The trapezoid may also be replaced by a parallelogram or other quadrilateral.

It would be well to note the following point:

The Constantin windvane, above referred to, becomes unstable when the wind first attacks it on the large side of the pivoted trapezoid which is one of its characteristics.

Now in this connection it may be of interest to cause the wind to enter by the large side, either by turning the windvane through 180° about the lever 23 and utilize this new position as shown in Fig. 2, or by sufficiently prolonging the side 22 of the trapezoid as shown in Fig. 3. In this case, in fact, the opening force of the slot will be increased in proportion as the slot becomes further opened and all uncertainty of operation will be avoided.

It is to be understood that the hereinbefore disclosed link and lever arrangement may be replaced by its equivalent without departing from the scope of the invention as comprehended within the scope of the appended claims.

What I claim is:

1. In aircraft the combination of a wing, stabilizing means carried by said wing, two vanes symmetrically disposed with respect to a plane intersecting the chord of said wing, rigid means interconnecting said vanes, two pivots symmetrically disposed with respect to the said plane, connecting means articulated at one end to said pivots and at the other end to said rigid means interconnecting said vanes, balancing elements on said connecting means whereby the assembly formed by said vanes, said rigid means, and said connecting means, is balanced indiscriminately about said pivots, and means operatively associated with one of said connecting means for actuating said stabilizing means.

2. In an automatic control device for an airplane wing, a combination of stabilizing means carried by said wing, two vanes symmetrically disposed with respect to a plane angularly disposed relative to the chord of said wing, rigid means interconnecting said vanes, two pivots symmetrically disposed with respect to the said plane, connecting means articulated at one end to said pivot, means interconnecting said vanes, balancing devices mounted on said connecting means whereby the assembly formed by said means and rigid means and said connecting means, is balanced indiscriminately about said pivots and a lever actuatable by one of said connecting means for actuating the stabilizing means of said wing, said assembly being responsive to the direction of the airstream so as to function when the angle of the airstream to the chord of said wing is greater than the angle of said plane to said chord.

3. In aircraft in combination, a wing, stabilizing means carried by said wing, two vanes symmetrically disposed with respect to a plane angularly inclined to the chord of said wing, rigid means interconnecting said vanes, a fixed pivot, a second pivot disposed symmetrically with respect to said first pivot and said plane, links articulated at one end to the respective pivots and at the other to said rigid means interconnecting said planes, balancing devices mounted on said links on the opposite side of said pivots from the vanes whereby the assembly of vanes, rigid means and links, is balanced indiscriminately about said pivots, means for regulating the position of said second pivot by displacing said second pivot angularly with respect to said fixed pivot whereby the angle formed by the plane and the chord of said wing may be varied, means for holding said second pivot in a relatively fixed position after displacement thereof, and means operatively associating one of said links with the stabilizing means so that when the angle formed by the airstream with the chord of said wing becomes greater than the angle between said plane and said chord, the stabilizing means is energized.

4. In aircraft, in combination, a wing, stabilizing means carried by said wing, two vanes symmetrically disposed with respect to a plane angularly inclined to the chord of said wing, a rod interconnecting said vanes, a fixed pivot disposed in front of said vanes, a second pivot disposed symmetrically with respect to said first pivot and said plane, links articulated at one end to the respective pivots and at the other to said rod at points located on said rod at a distance from each other smaller than the distance between said pivots, balancing devices mounted on said links at the opposite side of said pivot from the vanes whereby the assembly of vanes, rod and links is balanced about said pivots, means for regulating the position of said second pivot by displacing said second pivot angularly with respect to said fixed pivot whereby the angle formed by the plane and the chord of said wing may be varied, means for holding said second pivot in a relatively fixed position after displacement thereof, and means operatively associating one of said links to the stabilizing means so that when the angle formed by the air-stream with the chord of said wing becomes greater than the angle between said plane and said chord, the stabilizing means is energized.

5. In aircraft, in combination, a wing, stabilizing means carried by said wing, two vanes symmetrically inclined with respect to a plane angularly inclined to the chord of said wing, a rod interconnecting said vanes, a fixed pivot disposed behind said vanes, a second pivot disposed symmetrically with respect to said first pivot and said plane, links articulated at one end to the respective pivots and at the other to said rod at points located on said rod at a distance from each other greater than the distance between said pivots, balancing devices mounted on said links at the opposite side of said pivot from the vanes, whereby the assembly of vanes, rods, and links is balanced about said pivots, means for regulating the position of said second pivot by displacing said second pivot angularly with respect to said fixed pivot, whereby the angle formed by the plane and the chord of said wing may be varied, means for holding said second pivot in a relatively fixed position after displacement thereof, and means operatively associating one of said links to the stabilizing means, so that when the angle formed by the airstream with the chord of said wing becomes greater than the angle between said plane and said chord, the stabilizing means are energized.

6. In aircraft in combination, a wing, an auxiliary surface pivotally mounted about an axis parallel to the leading edge of said surface and in front thereof, an aileron hingedly connected to the trailing edge of said wing, two vanes symmetrically disposed with respect to a plane angularly inclined to the chord of said wing, rigid means interconnecting said vanes, a fixed pivot, a second pivot disposed symmetrically with respect to said first pivot and said plane, links articulated at one end to the respective pivots and at the other to said rigid means interconnecting said planes, balancing devices mounted on said links on the opposite side of said pivots from the vanes whereby the assembly of vanes, rigid means and links is balanced indiscriminately about said pivots, means for regulating the position of said second pivot by displacing said second pivot angularly with respect to said fixed pivot whereby the angles formed by the plane and the chord of said wing may be varied, means for holding said second pivot in a relatively fixed position after displacement thereof, and means operatively associating one of said links with said auxiliary surface and with said aileron so that when the angle formed by the airstream with the chord of the wing becomes greater than the angle between said plane and said chord, the auxiliary surface is rotated toward the front so as to form a slot with the wing, and the aileron is simultaneously rotated in a downward direction.

In testimony whereof I have signed this specification.

LOUIS CONSTANTIN.